Aug. 31, 1948.    H. S. KIRSCHBAUM    2,448,442
REGULATING SYSTEM
Filed Aug. 30, 1946
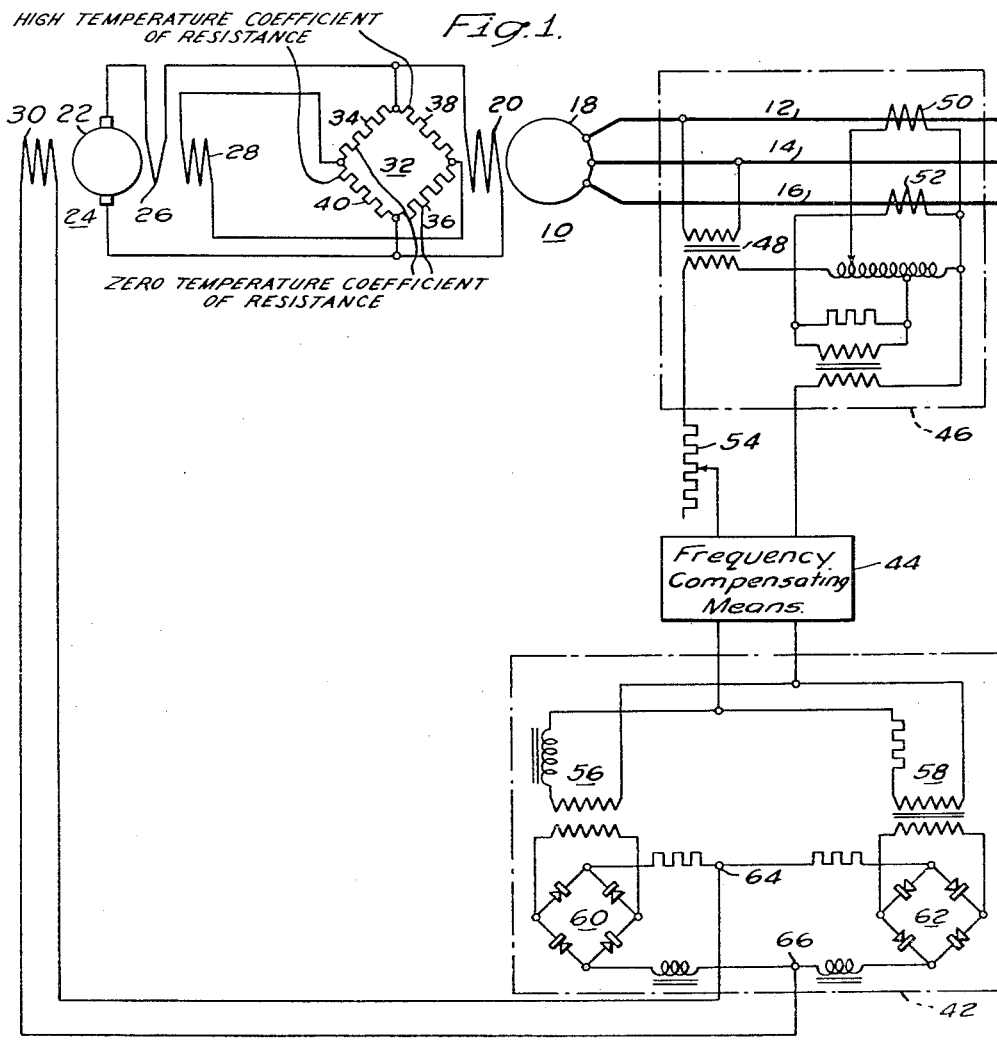
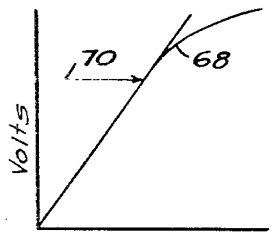
Fig. 2.
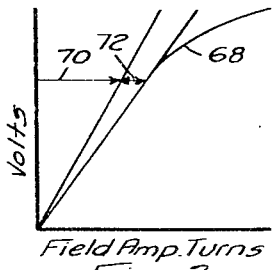
Fig. 3.
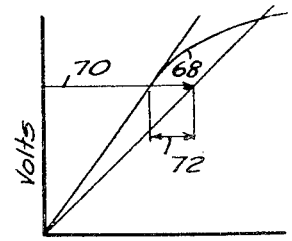
Fig. 4.
WITNESSES:
INVENTOR
Herbert S. Kirschbaum
BY
ATTORNEY Patented Aug. 31, 1948

2,448,442

UNITED STATES PATENT OFFICE 2,448,442

REGULATING SYSTEM

Herbert S. Kirschbaum, Pittsburgh, Pa., assignor to Westinghouse Electric Corporation, East Pittsburgh, Pa., a corporation of Pennsylvania Application August 30, 1946, Serial No. 694,065

4 Claims. (Cl. 322—77)

This invention relates to regulating systems.

Regulating systems which utilize exciters for controlling the excitation of generators have been known for years. Recently a self-excited or "series tuned" exciter which normally operates along the linear part of its saturation curve has been utilized in such regulating systems. Such exciters have a series field winding for normally supplying the excitation requirements of the machine and at least one control field winding disposed to be directionally energized in response to the operation of a generator, the excitation of which is controlled by the exciter.

In systems of this type, it has been found that changes in load supplied by the generator effects changes in the temperature of the generator field winding with the result that the resistance of the armature circuit of the exciter which includes the generator field winding, changes and the self-excited exciter becomes either "undertuned" or "over-tuned." This is unsatisfactory for regulating purposes.

An object of this invention is to provide in a regulating system which utilizes a self-excited exciter for controlling the excitation of a generator, for effecting temperature compensation for the exciter to maintain it "tuned" as the generator field temperature varies.

Other objects of this invention will become apparent from the following description when taken in conjunction with the accompanying drawing, in which:

Figure 1 is a diagrammatic representation of a regulating system embodying the teachings of this invention.

Fig. 2 is a graph the curves of which represent the normal excitation characteristics of the tuned exciter of the system of Fig. 1;

Fig. 3 is a graph the curves of which represent the excitation of the exciter under temperature conditions above normal operating temperatures of the armature circuit of the exciter;

Fig. 4 is a graph the curves of which represent the excitation of the exciter under temperature conditions below normal operating temperature for the armature circuit of the exciter.

Referring to the drawing there is illustrated in Fig. 1, a generator 10 shown as connected to supply a three-phase load circuit represented by conductors 12, 14 and 16. The generator 10 comprises the armature windings 18 and the field windings 20, the field windings 20 being connected across the armature windings 22 of an exciter 24 which is provided with a series field winding 26.

The self-excited exciter 24 is so designed that at a given normal operating temperature the series field winding 26 is sufficient for providing the entire excitation of exciter 24 when the generator 10 is operating to maintain normal line voltage across the load conductors 12, 14 and 16. In addition to the self-exciting winding 26, the exciter 24 is provided with a shunt field winding 28 and a control field winding 30.

The shunt field winding 28 is disposed to be energized in response to temperature changes above or below the normal operating temperature of the armature circuit of the exciter 24. Thus the field winding 28 is connected across the output terminals of a resistor bridge 32, the input terminals of which are connected across the armature windings 22 of the exciter 24. The resistor bridge 32 is composed of four resistor elements 34, 36, 38 and 40, the resistors 34 and 36 being of a material having zero temperature coefficient of resistance and the resistors 38 and 40 being formed of material such as nickel and having a high temperature coefficient of resistance. Preferably, the resistor bridge 32 is positioned adjacent the generator 10 where the ambient temperature with respect to the bridge 32 increases with an increase in load supplied by the generator 10. Thus the resistor bridge 32 may be positioned adjacent the frame of the alternating current generator 10 or in the flow of air leaving the generator.

The control field winding 30 of the tuned exciter 24 is disposed to be deenergized when the generator 10 is operating to maintain normal regulated line voltage and is directionally energized as the line voltage departs from normal to so excite the exciter 24 as to correct the excitation of the generator 10 to correct for such departure and maintain the line voltage substantially at its normal value. As illustrated, the control field winding 30 is connected through a voltage measuring circuit 42 and a frequency compensating means 44 to be supplied by the line voltage, a network 46 being utilized to derive a positive sequence component of the line voltage for supplying a measure of the line voltage.

The network 46 for deriving the positive sequence component of the line voltage is disclosed and claimed in the copending application of E. L. Harder, Serial No. 560,299 filed October 25, 1944, now Patent No. 2,426,018. Briefly, the network comprises the potential transformer 48 for deriving a single phase of the three-phase line voltage having no zero-sequence voltage-component and current transformers 50 and 52 which cause line current to pass through the impedance in the network in such a manner as to produce a voltage drop substantially corresponding to the negative-sequence line-voltage, and the voltage drop thus resulting is subtracted from the single phase of the line voltage to produce substantially the positive-sequence component of the line voltage. Other embodiments of the positive-sequence component network 46 are disclosed and claimed in the aforementioned Patent 2,426,018 and may be employed instead of the specific network 46 illustrated in Fig. 1.

An adjustable resistor 54 is connected in the output circuit from the network 46 for providing a voltage adjusting means. The frequency compensating means 44 may be any suitable arrangement of capacitors and inductance apparatus for accomplishing the purpose of compensating for frequency. As will be appreciated, in many cases, the frequency of the line voltage will not fluctuate greatly, and it may not be necessary to utilize the compensating means 44, but instead the positive-sequence component of the line voltage from the network 46 will be supplied directly to the voltage reference or measuring network 42.

The voltage reference network 42 is disclosed in detail in the copending application Serial No. 567,256, filed December 8, 1944, of E. L. Harder, et al., now Patent No. 2,428,566. Briefly, the network 42 comprises a non-linear impedance circuit 56 and a linear impedance circuit 58 connected to be simultaneously energized in accordance with the line voltage and, in particular, by the positive-sequence component of the line voltage. The non-linear impedance circuit 56 and the linear impedance circuit 58 are connected through insulating transformers across dry-type rectifying units 60 and 62, respectively, the output terminals of the rectifying units being connected in series circuit relation with each other through suitable series-connected resistors and series-connected smoothing reactors. The control field winding 30 is disposed to be connected across the direct-current series circuit of the rectifying units at taps 64 and 66, which taps are at zero potential when the generator 10 is operating to maintain normal regulated line voltage. The elements of the non-linear impedance circuit 56 and of the linear impedance circuit 58 have intersecting impedance characteristics and, as the line voltage fluctuates from the predetermined value, the current drawn by the circuits varies with the result that an unbalanced condition between the output of the rectifying units occurs and the control field winding 30 is energized in one or the other direction.

In operation, assuming that the generator 10 and the series tuned exciter 24 are being driven by some suitable means (not shown) for supplying power at a constant voltage to a load (not shown), the windings 26 are sufficient for normally maintaining the excitation of the generator 10 to maintain substantially constant voltage across the line conductors 12, 14 and 16. Under the constant voltage conditions of the line, the positive-sequence network 46 functions to deliver a positive-sequence component of the generator voltage to the frequency compensating means 44 and from thence to the network 42.

The non-linear impedance circuit 56 and the linear impedance circuit 58 are so selected that when the positive-sequence component of the line voltage is impressed upon the network 42, the circuits 56 and 58 have intersecting impedance characteristics and the voltages across rectifying units 60 and 62 and at the taps 64 and 66 are equal and so balanced that a voltage drop does not appear across the control field winding 30.

Under such conditions of operation, the armature circuit of the exciter 24 which includes the field winding 20 of generator 10 has a definite resistance as the machines are operating at normal operating temperature. In such instances, and in the embodiment shown, the series field winding 26 is sufficient to so maintain the excitation of the exciter that it is tuned to operate along the linear part of its saturation curve as shown in Fig. 2 of the drawing. In this figure, curve 68 represents the saturation curve and the arrow 70 represents the amount of excitation of the ampere turns of the series field winding 26. As the bridge 32 is balanced at the normal operating temperature of the machine there is no energy in the field winding 28.

If the load supplied by conductors 12, 14 and 16 should increase with a resulting decrease in the line voltage from the predetermined value, then the current flow in the field windings 20 of the generator 10 tends to increase thereby tending to heat the field winding and increase its resistance. Without the temperature compensating resistor bridge 32 and the shunt field winding 28 the exciter 24 would be undertuned.

The decrease in the line voltage referred to effects a decrease in the positive-sequence component delivered to the network 42. Under such conditions, the linear impedance circuit 58 draws more current than the non-linear impedance circuit 56 and the output voltages across the rectifying units 60 and 62 are unbalanced. With such an unbalanced condition, the larger potential across the rectifying unit 62 effects a voltage drop across the control field winding 30 in a direction to produce an action to aid the field windings 26 and 28 to increase the output of the exciter 24 to increase the excitation of the generator 10 to return the line voltage to the predetermined value.

The increase in voltage across field winding 20 will effect a slow increase in the temperature of the bridge 32 thereby increasing the resistance of resistors 38 and 40 but will not change the resistance of resistors 34 and 36 which have zero temperature coefficients. The unbalance over a period of time in the resistor bridge 32 due to the increase in voltage causes current to flow in the shunt field winding 28 in such a direction as to effect an excitation which will aid the series field winding 26 to maintain the exciter 24 tuned. This is illustrated in Fig. 3 in which the arrow 70 represents the amount of excitation of the ampere turns of the series field winding 26 and the arrow 72 represents the amount of excitation of the ampere turns of the shunt field winding 28, the two being additive with the result that the exciter 24 is tuned to operate along the linear part of its saturation curve 68.

If the load supplied by conductors 12, 14 and 16 should decrease with a resulting increase in the line voltage from the predetermined value, the current flow in the field windings 20 of the generator tends to decrease with the result that the temperature of the field windings is decreased with a corresponding decrease in the resistance of the windings. Without the temperature compensating field winding 28, the exciter 24 would then be overtuned.

The increase in the line voltage referred to, causes the non-linear impedance circuit 56 to draw more current than the linear impedance circuit 58 and the network is unbalanced to effect a voltage drop across the control field winding 30 in a direction to produce an action to oppose the tuned excitation of the exciter 24 to decrease the excitation of the exciter and thereby effect a decrease in the excitation of the generator 10 to maintain the line voltage at its predetermined value. However, the decrease in voltage across field winding 20 will effect a decrease in the temperature of the resistor bridge 32 whereby the temperature of resistors 38 and 40 is decreased but resistors 34 and 36 are unchanged. The resulting unbalance in the resistor bridge 32 causes current to flow in the shunt field winding 28 in such a direction as to effect an excitation which will oppose the effect of the series field winding 26 to maintain the exciter 24 tuned. Fig. 4 illustrates the action of the temperature compensating field winding 28 for as shown the excitation of the ampere turns of the shunt field winding 28 represented by the arrow 72 opposes the excitation of the ampere turns of the series field winding represented by the arrow 70 with the result that the exciter 24 is tuned to operate along the linear part of its saturation curve 68.

The temperature compensating bridge is easily adjusted for normal temperature operations and cooperates in the regulating system to maintain the exciter tuned for the different operations whereby the control field winding is effective to control the excitation of the exciter and consequently that of the generator to maintain the predetermined line voltage. The elements of the system are readily duplicated and are not easily damaged.

I claim as my invention:

1. In a regulating system for an alternating current generator provided with a field winding, in combination, a regulating exciter for controlling the field excitation of the generator, a series field winding for the exciter for normally supplying the excitation of the exciter, a control field winding for the exciter disposed to be energized in accordance with a departure of the generator voltage from a predetermined value, a resistor means connected across the exciter and disposed to be responsive to temperature changes of the generator field winding to effect a change in the resistance of the resistor means, and a field winding for the exciter disposed in circuit relation with the resistor means to be responsive to changes in the resistance thereof, the latter said field winding cooperating with the series field winding of the exciter for maintaining normal excitation of the exciter under changing temperature conditions of the generator field winding.

2. In a regulating system for an alternating current generator provided with a field winding, in combination, a regulating exciter for controlling the field excitation of the generator, a series field winding for the exciter for normally supplying the excitation of the exciter, a control field winding for the exciter disposed to be energized in accordance with a departure of the generator voltage from a predetermined value, a resistor means connected across the exciter and disposed to be responsive to temperature changes of the generator field winding to effect a change in the resistance of the resistor means, and a shunt field winding for the exciter disposed in circuit relation with the resistor means to be responsive to changes in the resistance thereof, the shunt field winding cooperating with the series field winding of the exciter for maintaining normal excitation of the exciter under changing temperature conditions of the generator field winding.

3. In a regulating system for an alternating current generator provided with a field winding, in combination, a regulating exciter for controlling the field excitation of the generator, a series field winding for the exciter for normally supplying the excitation of the exciter, a control field winding for the exciter disposed to be energized in accordance with a departure of the generator voltage from a predetermined value, a resistor bridge circuit connected across the exciter and disposed to be responsive to temperature changes of the generator field winding to effect a change in the resistance of the bridge circuit, and a shunt field winding for the exciter connected across the bridge circuit, the shunt field winding cooperating with the series field winding of the exciter for maintaining normal excitation of the exciter under changing temperature conditions of the generator field winding.

4. In a regulating system for an alternating current generator provided with a field winding, in combination, a regulating exciter for controlling the field excitation of the generator, a series field winding for the exciter for normally supplying the excitation of the exciter, a control field winding for the exciter disposed to be energized in accordance with a departure of the generator voltage from a predetermined value, a resistor bridge circuit connected across the exciter, the bridge circuit comprising two legs each of which is composed of a zero temperature coefficient resistor and a high temperature coefficient resistor but disposed in the opposite sense, the bridge circuit being disposed to be responsive to changes in voltage across the generator field winding to effect a change in the resistance of the resistors having the high temperature coefficient, and a shunt field winding for the exciter connected across the bridge circuit disposed to be directionally energized in accordance with the change in resistance of the resistors having the high temperature coefficient, the shunt field winding cooperating with the series field winding of the exciter for maintaining normal excitation of the exciter under changing temperature conditions of the generator field winding.

HERBERT S. KIRSCHBAUM.